United States Patent
Williams et al.

(10) Patent No.: US 7,615,182 B2
(45) Date of Patent: Nov. 10, 2009

(54) CONCRETE BLOCK AND METHOD OF MAKING SAME

(75) Inventors: Raymond F. Williams, Massillon, OH (US); Christopher C. McCoy, Massillon, OH (US)

(73) Assignee: U.S. Technology Corporation, Canton, OH (US)

( * ) Notice: Subject to any disclaimer, the term of this patent is extended or adjusted under 35 U.S.C. 154(b) by 0 days.

(21) Appl. No.: 12/284,390

(22) Filed: Sep. 22, 2008

(65) Prior Publication Data

US 2009/0039558 A1 Feb. 12, 2009

Related U.S. Application Data

(62) Division of application No. 10/825,733, filed on Apr. 15, 2004, now Pat. No. 7,438,757.

(51) Int. Cl.
*B28B 3/00* (2006.01)
(52) U.S. Cl. .................. 264/333; 264/DIG. 43
(58) Field of Classification Search ........... 264/333, 264/DIG. 43
See application file for complete search history.

(56) References Cited

U.S. PATENT DOCUMENTS

| 1,633,790 | A | 6/1927 | Lindstrom |
| 4,019,919 | A | 4/1977 | DeSalvo |
| 4,058,406 | A | 11/1977 | Raponi |
| 4,398,960 | A | 8/1983 | Murray |
| 4,427,818 | A | 1/1984 | Prusinski |
| 4,673,437 | A | 6/1987 | Gelbman |
| 2003/0084822 | A1 | 5/2003 | Barrow |

FOREIGN PATENT DOCUMENTS

| JP | 0585797 | 4/1993 |
| JP | 05132343 | 5/1993 |
| JP | 05139807 | 6/1993 |
| JP | 2000053457 | 2/2000 |

OTHER PUBLICATIONS

*Recycling of Spent Abrasive Media In Nonstructural Concrete*, Webster et al., Jrnl of Environmental Engineering (1996), 122(9), 840-849.
*Reuse of Abrasive Blast Media From the Ship Building Industry Into Concrete*, White et al., Hazardous and Industrial Wastes (1998), 30th, 257-266.

*Primary Examiner*—Paul Marcantoni
(74) *Attorney, Agent, or Firm*—Sand & Sebolt

(57) ABSTRACT

A concrete building block containing Portland cement, a filler, water, and a quantity of particularly sized plastic particles, such as spent abrasive particles of a thermoset plastic. The associated method of producing such blocks eliminates the need of curing the blocks in a heated humidity controlled environment in order for the blocks to attain the required water content for hydration of the cement.

20 Claims, 1 Drawing Sheet

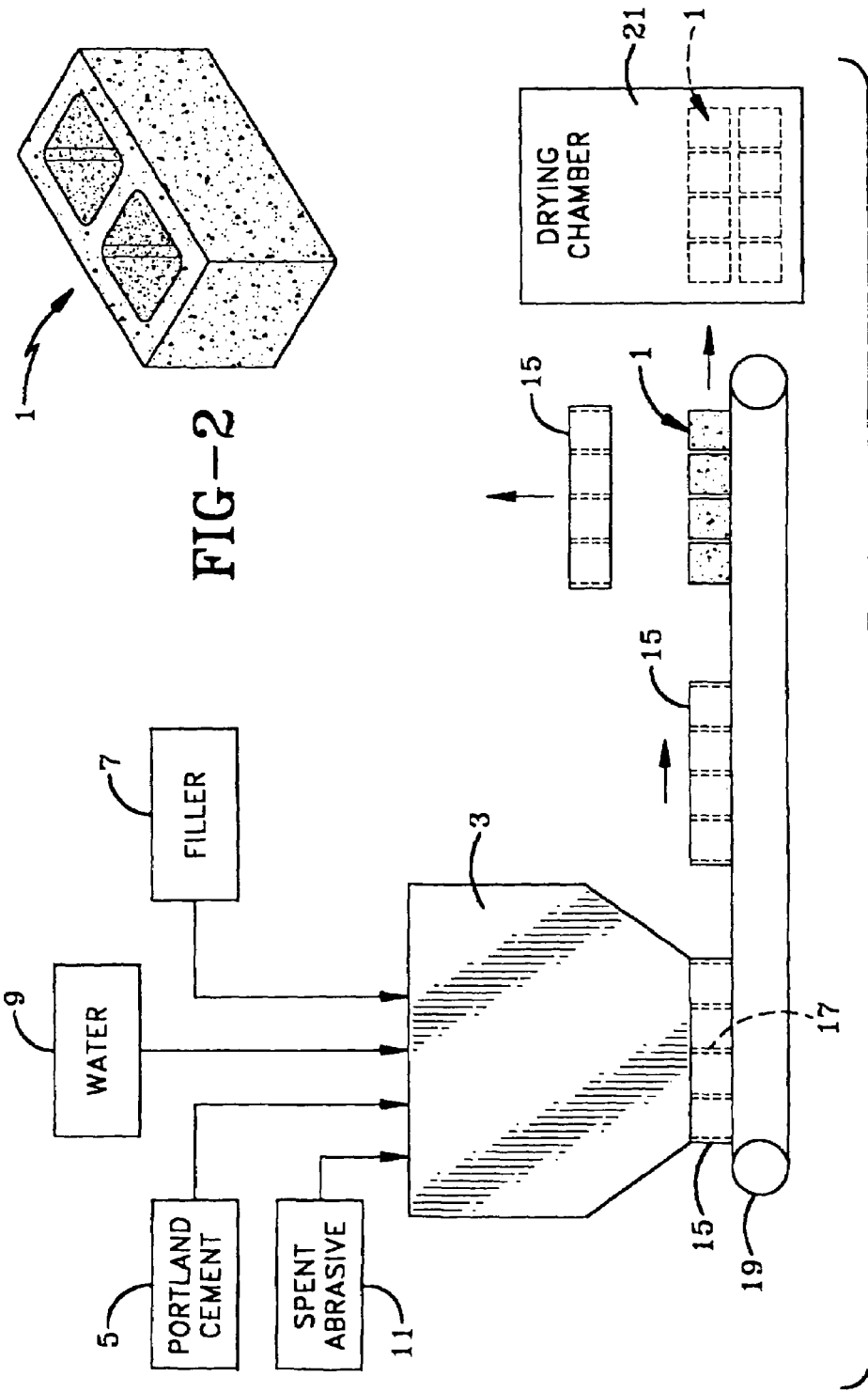

CONCRETE BLOCK AND METHOD OF MAKING SAME

CROSS-REFERENCE TO RELATED APPLICATIONS

This Application is a divisional of U.S. patent application Ser. No. 10/825,733 filed Apr. 15, 2004 now U.S. Pat. No. 7,438,757; the disclosure of which is incorporated herein by reference.

BACKGROUND OF THE INVENTION

1. Technical Field

The invention relates to structural building blocks, and in particular to a concrete masonry block. Even more particularly, the invention relates to a concrete block having a composition which includes a portion of spent abrasive particles and to the method of making the block.

2. Background Information

Concrete masonry blocks have been used in the building industry for many years and are produced in various sizes, configurations, etc., and are formed from various mixtures of materials. Likewise, there are a variety of manufacturing processes for forming the finished concrete blocks. The blocks have various features, such as a desired or required strength, size, configuration, color, water repellency, etc.

Furthermore, the composition or material makeup of these blocks vary considerably depending upon the desired characteristics to be achieved, such as the price of the finished block, and availability of the materials to be used therein, industry standards, and building codes. One of the main ingredients in these blocks is a filler material which adds strength and bulk to the block and provides various features to the block, such as a binder, color enhancer, etc. These filler materials usually are readily available and are low cost, and in many situations is waste materials, such as fly ash, ground granulated blast furnace slag, and other waste byproducts from manufacturing processes.

Many of these prior concrete or masonry blocks meet the standard industry requirements for water repellant structures. However, this is accomplished by adding costly blends of organic and inorganic materials, such as calcium sterate, ligno sulfates, liquid polymers, surficants, and other ingredients to seal the voids created in the mix design matrix. Inclusion of thermoset particulate media, as set forth in the present invention, accomplishes what these admix chemicals do, but at a lower cost, and a different mechanism.

Another problem with current block manufacturing methods is the removal of excess water from the formed block, usually by applying heat in a drying chamber, such as a kiln or curing room. The ideal situation for the block producer is to have enough water in the mix to completely hydrate the cement in the block in the block forming machine, but not have the block slump upon coming out of the block forming machine. If too much water is contained in the mix, the block will not hold its shape, and cannot be satisfactorily transported without adverse affects to the blocks.

Another problem in forming blocks, especially those desiring a uniform color, is that the wide swings in water content effects the final color of the block.

The various block compositions include various types of filler materials, such as blast furnace slag, fly ash, limestone, sand, gravel, and various lightweight aggregates, which provides the material to which the Portland cement bonds for forming the desired structural block. The particular filler material chosen will effect the cost and structural strength, as well as the water repellency of the finished block. Various types of waste materials, such as fly ash, blast furnace slag, and plastics material, have been used as fillers to provide a use for heretofore useless material.

One type of waste byproduct used as a filler in block manufacturing is various types of plastics. Some examples of concrete block compositions which use various types of plastics as filler material are shown in U.S. Pat. Nos. 4,019,919; 4,058,406; and 4,427,818. Although the blocks of these patents may prove satisfactory for certain applications, it is believed that they may possess certain drawbacks eliminated by the block of the present invention.

In the abrasive blasting art, a considerable quantity of spent abrasive materials, and in particular a thermoset particulate medium, results from blasting procedures. Heretofore, this material had to be placed in a landfill or disposed of in other non-productive manners. Although others in the industry have attempted to incorporate plastic waste products in concrete blocks, the results have not been entirely satisfactory due to the oversizing of the plastic particles used therein.

Therefore, the need exists for an improved concrete block and method of manufacture which uses as one of its filler materials an aggregate polymer, preferably thermoset plastic particles recovered from an abrasive blasting process, to eliminate disposing of such particles in a land fill; and which provides a block which is water repellant, able to be colored, which has increased strength, and which reaches water equilibrium without the addition of water/moisture in a curing chamber.

BRIEF SUMMARY OF THE INVENTION

One aspect of the present invention is to provide a concrete block containing aggregate polymer as part of the filler material, and in particular, spent abrasive thermoset material which provides excellent water repellency properties to the finished block, which provides a block having the required strength, which block is more color consistent when adding color pigments to the block mixture, and which enables the moisture content of the block to be controlled during manufacture, eliminating the need of costly heated drying chambers to remove excess moisture from the finished block.

Another aspect of the present invention is to provide a concrete block in which the aggregate polymer is a thermoset material, such as polyester, urea formaldehyde, cast acrylic, melamine formaldehyde, phenol formaldehyde, and epoxy, polyurethane, which when correctly sized and added to the block mixture, provides the desired results discussed above.

A further feature of the present invention is to provide the polymer material with a particle size of 50 mesh or smaller for the majority of the particles contained in the mixture, wherein at least 70% passes through a 50 mesh screen, 45% to 50% of the particles have a size greater than 100 mesh, and wherein a maximum of 5% of the abrasive particles are retained on a 30 or greater mesh screen.

Another aspect of the present invention is to provide a highly water repellent block without the addition of costly manufactured and blended chemicals, and in which enough water is able to be introduced into the mix prior to molding the blocks to completely hydrate the cement content of the block without the need of the costly process of encapsulating the green concrete block in a high humidity or steam atmosphere.

Still another feature of the invention is to provide a concrete block with reduced efflorescence due to the density of polymer media contained in the mixture.

These features and advantages are obtained by the concrete block of the present invention, the general nature of which may be stated as comprising a mixture of reclaimed spent abrasive particles, Portland cement, water, and a filler, said mixture having the approximate composition by weight of 10 to 15% of Portland cement, 65 to 80% filler, and 8 to 15% of the abrasive particles, wherein the majority of the abrasive particles have a particle size of 50 mesh or smaller.

These features and advantages are also obtained by the improved method of the present invention, the general nature of which comprises the steps of a) mixing about 8 to 15 parts, by weight of reclaimed spent abrasive particles with 10 to 15 parts of Portland cement, 65 to 80 parts of filler material, such as various natural aggregates, and 5 to 10 parts of water to form a slurry mixture; b) discharging said mixture into a block forming mold; c) compressing said mixture in said mold to form a block structure; d) removing the block structure from the mold; and e) removing excess moisture from the block structure.

BRIEF DESCRIPTION OF THE DRAWINGS

A preferred embodiment of the invention, illustrative of the best mode in which applicant contemplates applying the principles, is set forth in the following description and is shown in the drawings and is particularly and distinctly pointed out and set forth in the appended claims.

FIG. 1 is a diagrammatic view showing the manufacturing process for producing the improved concrete block of the present invention; and FIG. 2 is a perspective view of one type of concrete block containing the improved mixture of the improved composition of the present invention.

Similar numerals refer to similar parts throughout the drawings.

DETAILED DESCRIPTION OF THE INVENTION

FIG. 1 is a very diagrammatic view showing the method of the present invention for producing the improved concrete block indicated generally at 1, and shown in FIG. 2. FIG. 1 shows a usual mixing hopper 3 into which the various materials are placed and mixed for forming block 1. In particular, Portland cement 5, various types of filler materials 7, water 9, and in accordance with the invention, certain quantities of a spent abrasive 11, the details of which are discussed further below, are placed in measured amounts by augers, conveyors, etc. into hopper 3.

These ingredients are mixed and discharged into a form 15, which usually will contain a plurality of compartments 17 for forming a plurality of blocks 1. Upon filling of form 15 with the desired mixture of materials, the mixture is compressed by usual block forming equipment (not shown) which is usually located at the bottom or discharge end of the hopper. The filled form 15 is then moved along by various mechanisms, such as a conveyor 19, and at some location along the process, form 15 is removed, leaving a plurality of green blocks 1 on conveyor 19. These blocks are then moved into a drying chamber 21 for a predetermined time before being removed to a subsequent storage site.

In accordance with one of the features of the invention, one of the materials added to the mixture in hopper 3 which forms the concrete block mixture is spent abrasive particles 11, which preferably is a thermoset particulate media, such as urea formaldehyde, cast acrylic, melamine formaldehyde, phenol formaldehyde, polyester, epoxy, and polyurethane. It has been found that the best results are obtained when the vast majority of this thermoset particulate media passes through a 50 mesh screen. In the preferred blend of particulate media 95% will be retained on or pass through a 50 mesh screen, retaining no more than 5% by volume on the 50 mesh screen, with 45% to 50% being retained on a 100 mesh screen, and the remaining material passing through a 100 mesh screen. Also, it is preferred that not more than 10% pass through a 300 mesh screen. It has been found that these particularly sized particles of thermoset abrasive media provides the desired advantages and resulting block structure.

The remaining components of the block mixture are well known in the art, as well as the amount of each component. For example, in the preferred block composition, the admix in hopper 3 will consist of 12% by weight of Portland cement, 78% by weight natural aggregate, and 10% by weight of a spent abrasive 11. Water will be added to provide approximately 8% moisture content. Thus, this amount will vary depending upon the particular types of filler material in the admix.

Set forth below is a more detailed listing of the ranges and preferred sizes of the abrasive media which is added to the hopper.

| Spent Media Sieve Analysis/Particle Distribution (Retained) | | | | | | | |
|---|---|---|---|---|---|---|---|
| | Screen Sizes | | | | | | |
| | 4 | 16 | 30 | 50 | 80 | 100 | Pan |
| Ranges | 0 | 1-3% | 1-5% | 10-30% | 10-30% | 10-20% | 20-50% |
| Preferred | 0 | 1% | 4% | 25% | 25% | 15% | 30% |

One important advantage of the subject concrete block and method of producing the same is the ability to introduce enough water into the mix prior to the molding step to completely hydrate the cement content without the need for the costly process of encapsulating the green concrete block in a high humidity atmosphere after being formed by the block forming machine. This has the advantage of reduced curing costs. Heretofore, the need for expensive curing systems is due to the need to draw water into the block to enable the complete hydration of the cement content. Obtainment of the required water (moisture) for hydration is termed equilibrium.

There are several methods to determine equilibrium, but the simple scenario is to suspend several just manufactured blocks in a kiln or curing room and observe their weight. Next, introduce humidity in some form. Heat acts as the catalyst, shortening the overall curing time, but is not necessary for the hydration of the blocks of the present invention. However, due to the 28 day curing time of concrete, the addition of heat accelerates the hydration process. Observation of the blocks continue as they continue to absorb moisture. When the blocks no longer obtain weight, the blocks are said to be at equilibrium, and have absorbed all the moisture they will obtain, and at that point, should have enough water to completely hydrate the cement content. However, many times this is not obtained due to a variety of problems, such as flash cure, lack of total absorption, the presence of admixes, improper preset time, etc. The ideal situation for a block is to have enough water to completely hydrate the unit, but not have the block slump coming out of the block forming machine. It has been found that the present composition of the block discussed above, enables the block to reach equilibrium at the strip cycle of the green block from the block forming machine, that is, removal of form 15 from the blocks, whereby the blocks hold their shape and can be transported without adverse affect to chamber 21 where the blocks remain for a period of time where they dry by the heat of hydration in the ambient air eliminating the need of any additional heat and/or moisture.

Because of the required moisture to hydrate the cement is present within the block, and the block reaches equilibrium upon discharge from the hopper and the block forming machine, the heretofore required introduction of a heat and steam combination is eliminated. Therefore, it is only necessary to cure the block with the introduction of dry heat and at a rate that will allow the excess moisture to work its way to the surface and not be trapped due to a flash cure of the exterior of the block.

The elimination of the need to add humidity (moisture) into the blocks in a curing chamber produced by the method of the present invention was proven by the following test. A just produced skid of 80 blocks having a total weight of 5,096 lbs. was placed in drying chamber 21. After six hours, the weight was reduced by 6 lbs., and over the next 5½ hours, the weight was reduced by 22 lbs. The final weight of the skid was 5,044 lbs., or a loss of 52 lbs. of water, or approximately 6.5 gallons. Thus, Applicant's composition avoids the addition of any kind of humidity or moisture which will retard the hydration process, since enough water is able to be retained in the block, and in particular, in the mixture in hopper 3 and subsequently in the green block when being discharged from the block forming machine prior to removing the mold 15 from the formed blocks. Again, it is due to the inclusion in the admix of the specifically sized polymer particles which enables this feature to be obtained. It is also these polymer particles which provide the water repellency to the block without the addition of costly manufactured and blended chemicals heretofore required.

It also has been found that the use of the polymer particles in the admix of the block reduces the problems with efflorescence due to the density of the polymer particles contained therein. This is believed to be due to the water repellency provided by the admix and is present immediately upon manufacture and need not wait for the liquid polymers, organic, or inorganic chemicals to expend and cure as in prior block constructions.

Although the admix described above is primarily used for density and flow control of the material when forming the blocks rather than water repellency, the final block does have water repellency properties built in due to the use of the polymer particles.

It has been found that a white chalky appearance may result on the blocks produced by the method of the present invention, which is not efflorescence, but rather the fine polymer media being released, especially when the blocks are split in certain forming processes. This is believed to be due to the lack of adhesion of the very fine polymer particles inside the admix, and can be removed easily by a jet of water from a garden hose or pressure washer. This will eliminate any chalky appearance, and it does not return once cleaned.

Finished block 1 has been tested to provide increased strength than that required by the masonry block industry. Most manufacturers use 9% to 10% cement to aggregate ratio to make an ASTM (C90) qualifying block. The block of the present invention uses approximately 10 to 15% cement to aggregate ratio. Also, the Portland cement may be formed of a mixture of 10% ground blast furnace slag to 90% cementitious material. As a result, block 1 experiences compression tests in the 4,000 PSI range, which is twice the ASTM requirement of 1,960 PSI. Also as discussed above, since the block of the present invention reaches equilibrium at the forming machine, there is no need for the introduction of heat and steam combination.

In summary, the block of the present invention provides a block which has excellent water repellency properties, is considerably stronger than the ASTM standards required, uses recycled material eliminating the need to dispose of such materials in a landfill, is more color consistent when adding color pigment to the admix, and can be certified as Green Building by Scientific Certification Systems due to its recycled content of the polymeric materials.

Although the preferred polymeric material is a thermoset plastic as discussed above, other types of thermoplastic can be used so long as the size thereof is controlled in the manner discussed above. Also, another feature of the invention is the ability to use a spent abrasive having the controlled size discussed above, other than a thermoset plastic, such as aluminum oxide, copper slag, fine sand particles, garnet, glass beads, etc.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method of making a concrete block comprising the steps of:
    a) mixing about 8 to 15% by weight of spent abrasive particles the majority of which have a particle size of 50 mesh or smaller with 10 to 15% by weight of Portland cement, 65 to 80% by weight of natural aggregate which is different from the spent abrasive, and a quantity of water to form a slurry mixture;
    b) discharging the mixture into a block forming mold;
    c) compressing the mixture in the mold to form a block structure;
    d) removing the block structure from the mold; and
    e) removing excess moisture from the block structure.

2. The method of claim 1 wherein step (e) is carried out free of externally applied moisture.

3. The method of claim 1 wherein step (a) comprises the step of mixing about 12% by weight of Portland cement to form the slurry mixture.

4. The method of claim 1 further comprising the step of allowing the block structure to cure after removal from the mold without encapsulating the block structure in a steam atmosphere.

5. The method of claim 1 wherein 5 to 10% by weight of water is added in step (a) to form the slurry mixture.

6. The method of claim 1 wherein sufficient water is mixed in step (a) to provide approximately 8% by weight moisture to the block formed by step (c).

7. The method of claim 1 comprising the step of mixing ground granulated blast furnace slag with the Portland cement.

8. The method of claim 1 wherein the natural aggregate comprises limestone and sand.

9. The method of claim 1 wherein the abrasive particles are thermoset particulate media.

10. The method of claim 1 wherein the abrasive particles are selected from a group consisting of urea formaldehyde, cast acrylic, melamine formaldehyde, polyester, epoxy, polyurethane, and phenol formaldehyde.

11. The method of claim 1 wherein 45% to 50% of the abrasive particles have a size greater than 100 mesh.

12. The method of claim 11 wherein 5% or less of the abrasive particles have a size greater than 50 mesh.

13. The method of claim 12 wherein at least 70% of the abrasive particles have a size of 50 mesh or smaller.

14. The method of claim 13 wherein 10% or less of the abrasive particles have a size less than 300 mesh.

15. The method of claim 1 wherein 10% or less of the abrasive particles have a size less than 300 mesh.

16. The method of claim 15 wherein 5% or less of the abrasive particles have a size greater than 50 mesh.

17. The method of claim 1 wherein step (a) comprises the step of mixing the abrasive particles, Portland cement and natural aggregate with a quantity of water which is sufficient to completely hydrate the cement.

18. The method of claim 17 wherein the quantity of water is 5 to 10% by weight.

19. The method of claim 1 wherein step (c) comprises the step of compressing the mixture in the mold to form a green block structure; and wherein step (a) comprises the step of mixing the abrasive particles, Portland cement and natural aggregate with a quantity of water which is sufficient to enable the block structure to reach equilibrium by the time the green block structure is removed from the mold.

20. The method of claim 19 wherein the green block structure does not substantially slump at the time of step (d) or thereafter.

* * * * *